Jan. 4, 1966     C. B. WATTS, JR     3,227,950
LOAD COMPARISON MEASURING SYSTEM USING NETWORK
WITH HYBRID PROPERTIES
Original Filed Nov. 23, 1955     4 Sheets-Sheet 1
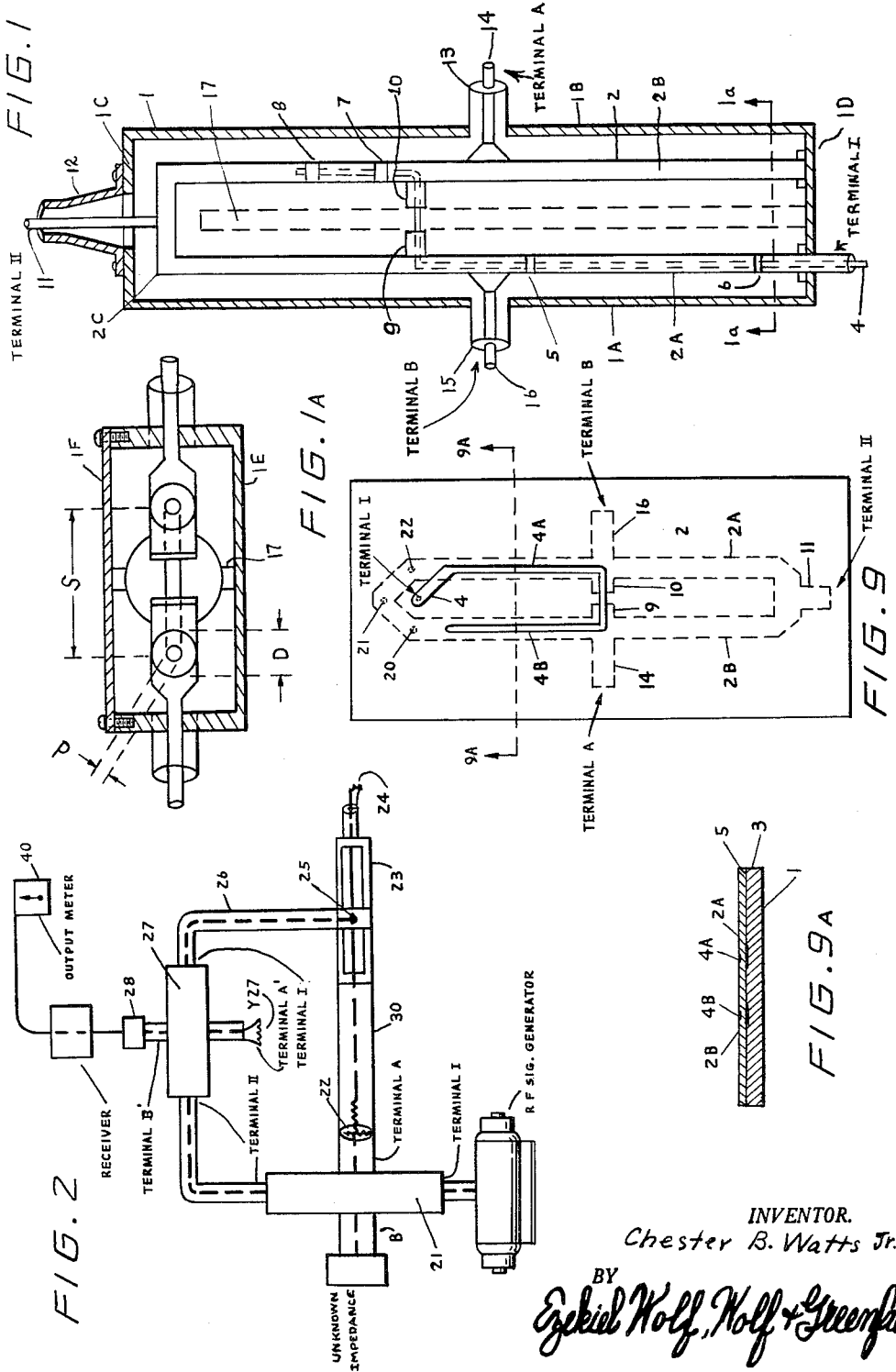
INVENTOR.
Chester B. Watts Jr.
BY
Ezekiel Wolf, Wolf & Greenfield Jan. 4, 1966            C. B. WATTS, JR            3,227,950
LOAD COMPARISON MEASURING SYSTEM USING NETWORK
WITH HYBRID PROPERTIES
Original Filed Nov. 23, 1955            4 Sheets-Sheet 2
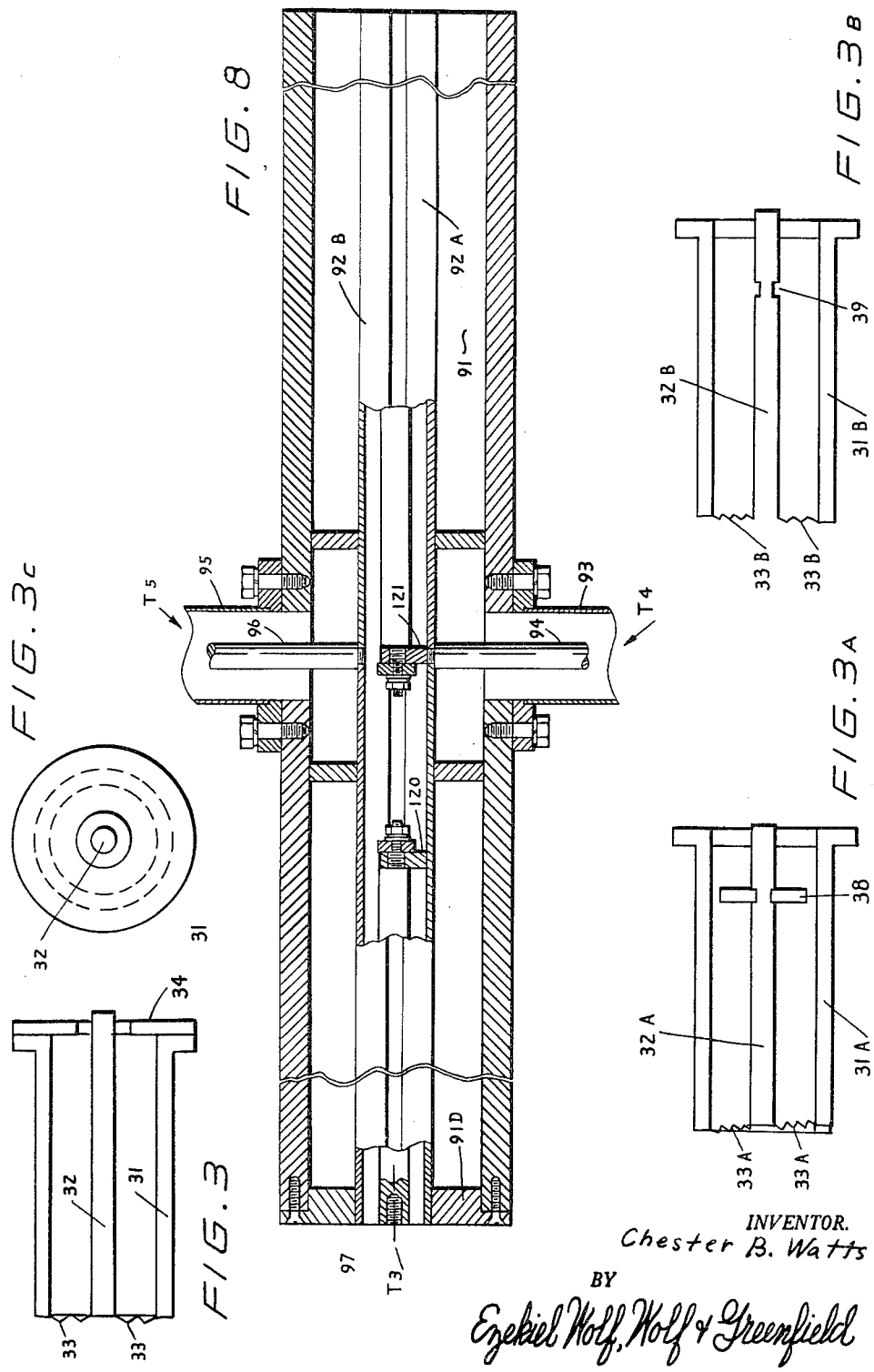
INVENTOR.
Chester B. Watts Jr
BY
Ezekiel Wolf, Wolf & Greenfield

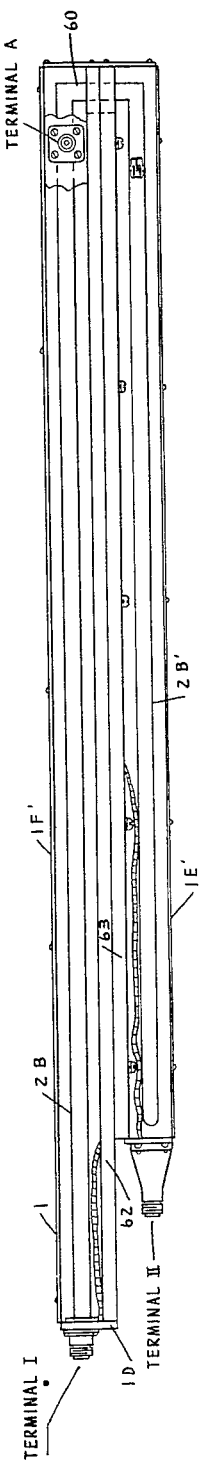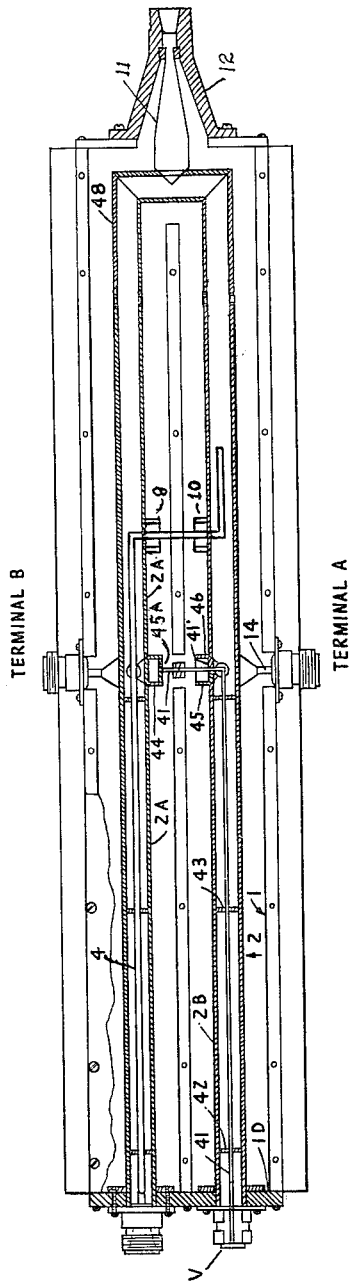
INVENTOR.
Chester B. Watts Jr.

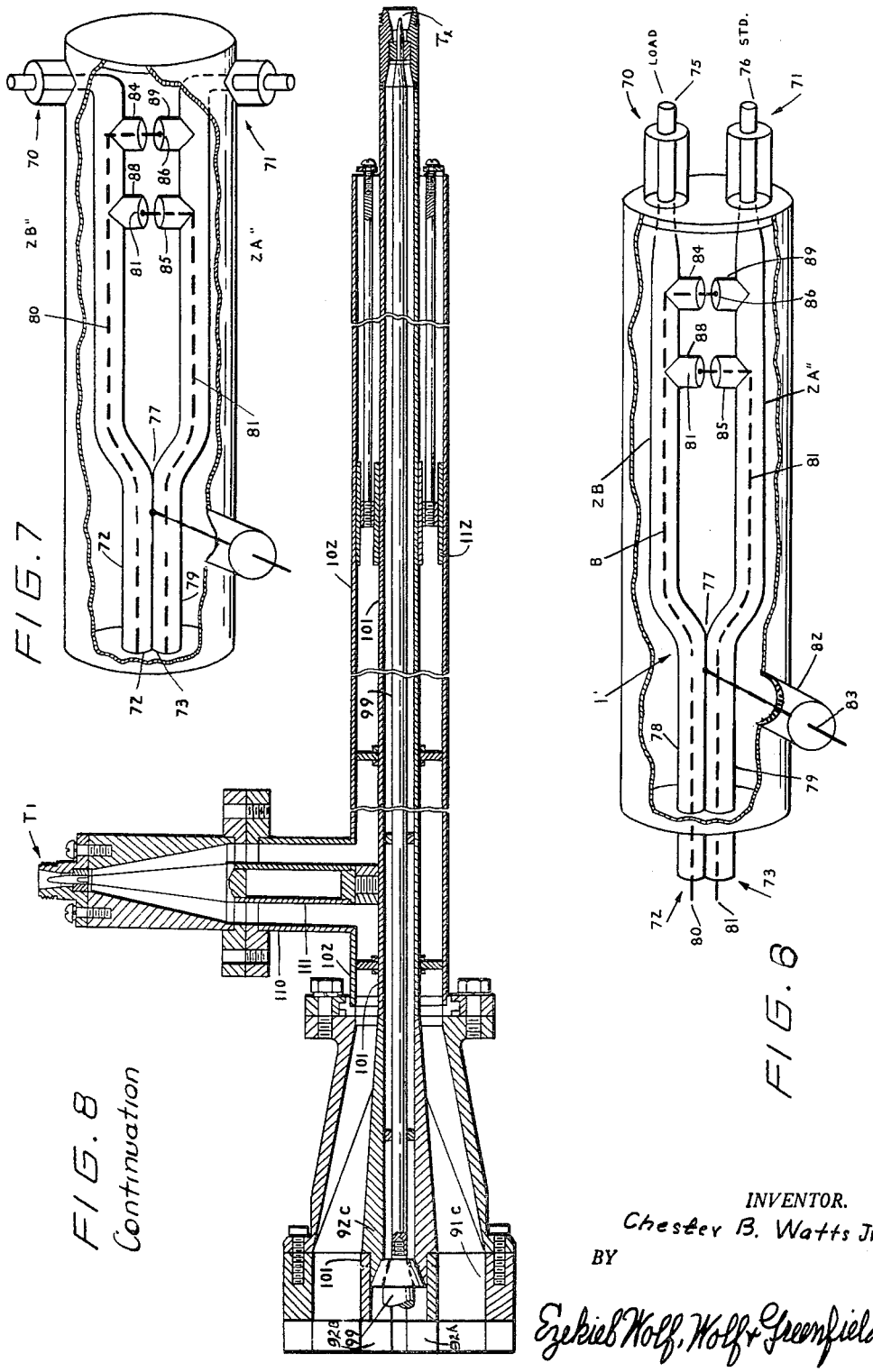

United States Patent Office 3,227,950
Patented Jan. 4, 1966

3,227,950
LOAD COMPARISON MEASURING SYSTEM USING NETWORK WITH HYBRID PROPERTIES
Chester B. Watts, Jr., Alexandria, Va., assignor to Andrew Alford, Boston, Mass.
Original application Nov. 23, 1955, Ser. No. 550,242, now Patent No. 2,976,497, dated Mar. 21, 1961. Divided and this application Dec. 19, 1960, Ser. No. 76,962
8 Claims. (Cl. 324—58)

This application is a division of the copending application Serial No. 550,242, filed, November 23, 1955 now U.S. Patent 2,976,497 and relates to radio frequency networks and, more particularly, to transmission line networks, which have properties in some respects similar to those of impedance bridges, or so-called hybrids, that are used at lower frequencies than those more particularly related to the present invention.

One object of the present invention is a transmission line network having two coaxial line inputs and two coaxial line outputs, interconnected in such a manner that when the two coaxial outputs are terminated with equal impedance, the two coaxial inputs become substantially independent of each other so that power delivered to either one of the two inputs proceeds to the impedances connected to the outputs rather than to the second input.

Another object of the present invention is to provide a hybrid network of the type mentioned above, having the property that when two substantially equal relative loads are connected to the two output terminals, and when values of these loads are equal to a certain specific design value for the network, the input impedances seen at either input remains substantially close to certain specific values of resistance over a wide frequency range.

Still another object of this invention is a radio frequency network with two coaxial inputs and three coaxial outputs which may be conveniently used for making impedance measurements at very high, ultra high and super high radio frequencies.

These, and other objects of the invention, will be described in detail in connection with the figures, in which:

FIG. 1 shows somewhat schematically an embodiment of the present invention;

FIGURE 1a shows a section looking at FIGURE 1 from section 1a from the bottom of FIGURE 1 upwards;

FIGURE 2 shows schematically a measuring circuit including the means shown in FIGURE 1;

FIGURE 3 shows schematically means which may be used in connection with FIGURE 1;

FIGURE 3a shows a modification of the view shown in FIGURE 3;

FIGURE 3b shows a further modification of the view shown in FIGURE 3;

FIGURE 3c shows an end view looking at the right end of FIGURE 3;

FIGURE 4 shows a modification of the arrangement of FIGURE 1 in minor details;

FIGURE 5 shows a still further modification of FIGURE 1 in which the bridge is folded on itself;

FIGURE 6 shows another modification of the bridge of FIGURE 4;

FIGURE 7 shows a modification of the arrangement of FIGURE 6;

FIGURE 8 is a further modification of the arrangement of FIGURE 1; and

FIGURES 9 and 9a show a "printed circuit" embodiment of the arrangement similar to FIGURE 1.

In FIGURE 1, numeral 1 denotes an elongated metal cavity which could be, for example, of rectangular, round, or elliptical cross-section. Within this cavity, and preferably symmetrically arranged with respect to the center line of the cavity, is placed a U-shaped conductor 2. The two ends of this U-shaped conductor are effectively connected to one of the short end walls of cavity 1; for example, to wall 1d, of the elongated cavity. By "effective connection" or "connection," it is means the type of connection which may or may not be effective for direct currents, but which presents a very low impedance at the frequencies at which the network is to be operated. For the purposes of description, it will be convenient to assign designations to three portions of the U-shaped conductor. The two substantially parallel legs of conductor 2 will be referred to as legs 2A and 2B. The portion of conductor 2 through which legs 2A and 2B are interconnected will be referred to as conductor 2C. Leg 2A is made hollow; for example, leg 2A could be a round metal tube. Leg 2B could also be a round metal tube, of the same diameter as leg 2A. In some cases leg 2B could be made solid but of the same outer diameter as leg 2A. As will be seen later, legs 2A and 2B are made round for convenience only. Under some circumstances, square cross-sections may be found more convenient than round ones. If desired, rectangular cross-sections or elliptical cross-sections could be used, although easy availability of material usually dictates that round or square cross-sections be adopted.

Through the hollow, substantially cylindrical space inside leg 2A, and preferably centrally located within it, is placed inner conductor 4. This conductor 4 is insulated from the inner surface of conductor 2A so that it can be used, together with conductor 2A, as a radio frequency transmission line. In practice, it is most convenient to locate conductor 4 coaxially with the inner cavity inside conductor 2A. This is usually accomplished by means of insulating beads, such as beads 5 and 6. At a point between the two ends of the U-shaped conductor 2, that is, at a point intermediate between 2C and 1D, conductor 4 is brought out through a hole in conductor 2A, and is either connected or coupled to conductor 2B. As shown in FIGURE 1, conductor 4 is coupled to conductor 2B. This coupling is accomplished by continuing conductor 4 out through the side of conductor 2A and through a hole in conductor 2B into the cavity inside conductor 2B, together with conductor 2B, conductor 4 forms a coaxial transmission line with the inner conductor supported by such insulating beads as, for example, beads 5,6,7 and 8. The coupled arrangement was found to be preferable to a direct connection of conductor 4 to conductor 2B, particularly when operation over a wide frequency range is desired. It was also found that short pieces of tubing, such as 9 and 10 are helpful for preserving the balance. Metal tube 9 is connected to conductor 2A, and a similar tube 10 is connected to conductor 2B. These pieces of metal tubing are made of equal lengths and are so arranged that a relatively small insulated gap exists between them. In the case when conductor 4 is coupled to conductor 2A, conductor 4 is arranged to go through these two pieces of tubing, but is insulated from both. When it is desired to connect conductor 4 directly to conductor 2B, it is convenient to solder in a metal plug into tube 10, and to connect conductor 4 directly to this plug.

Conductor 2C, at preferably the middle thereof, is connected to the inner conductor of a coaxial transmission line comprising inner conductor 11 which is surrounded by outer conductor 12. The outer conductor 12 of said coaxial transmission line 11, 12 is connected to the short end wall 1C. Two other coaxial transmission lines, conveniently referred to as output lines, are arranged and connected as follows: The outer conductor 13 of the output line is connected to long side 1B of cavity 1. The inner conductor 14 of this line is connected to leg 2B of U-shaped conductor 2. Similarly, outer conductor 15 of the second output line is connected to the other long side 1A of cavity 1, and the inner conductor 16 is connected to leg 2A of the U-shaped conductor 2. The output transmission lines are preferably arranged and connected at equal distances from short wall 1D of cavity 1.

When the bridge network of FIGURE 1 is to be used over a very wide frequency range, it is beneficial to add a longitudinal metal rib 17, which extends substantially along the center line of the cavity and is metallically bonded to the bottom 1E of the cavity and preferably also to the top 1F of the cavity, thus dividing the cavity almost into two equal cavities. The electrical effect of such a rib is to decrease the characteristic impedance of conductors 2A and 2B with respect to the walls of the cavity for the unbalanced mode, which is excited, for example, when power is supplied to parallel feed input terminal II, that is, to coaxial transmission line 11, 12. While the effect of the rib is to decrease the characteristic impedance for the unbalanced mode, it does not greatly change the characteristic impedance of conductors 2A and 2B for the balanced mode, particularly when the rib is fairly thin.

The bridge network of FIGURE 1 may be used for a variety of purposes, some of which will be described below. Suppose that a signal generator or an oscillator is connected to series feed input terminal I, that is the coaxial line comprising inner conductor 4 and the continuation of outer conductor 2A. If, at the same time, two equal loads are connected to side terminals A and B, equal and opposite potentials will exist at corresponding points on conductors 2A and 2B. At the center of conductor 2C, the potential is then substantially zero so that if one were to connect a suitable receiver to terminal II and this receiver were equipped with an output meter which would give readings that are proportional to the radio frequency voltage at the input terminals of the receiver, under conditions as described above, the output meter would indicate a very low reading. If, now, the impedance connected to terminal B is changed so that it is no longer equal to the impedance connected to terminal A, the potentials observed along conductors 2A and 2B become unequal either in phase or in magnitude or both, with the result that the potential at the center of conductor 2C is no longer substantially zero, but has a value which is related and indeed can serve as a measure of the difference between the impedances connected with terminals A and B. It has been found that the impedances connected with terminals A and B be algebraically equal, that is, the resistances must be equal and the reactances of the two loads must be equal. This property of the bridge circuit makes the circuit useful when it is desired to adjust the impedance of a production unit so that it would be equal to the impedance of a standard unit. For this purpose, the standard unit is connected to, say, terminal A while the production unit is connected to terminal B, and adjustments are made in the production unit until the reading of the output meter of the receiver connected to terminal II gives the lowest reading.

The bridge circuit may also be used as a diplexer which enables one to feed two transmitters into two antennas having substantially equal impedances. When the bridge circuit is fed by, say, transmitter X connected to terminal II, the two antennas may be excited with currents of equal magnitude and in the same relative phase. Transmitter Y, connected to terminal I, however, will excite the same antennas with current of the same magnitude, but in opposite phases. So long as the impedances of the two antennas with currents of the same magnitude, but in the two transmitters would be independent of each other in the sense that neither one would deliver power into the other. The two antennas referred to could be parts of an array; for example, an array used to produce a localizer course. In such a case, one transmitter would result in a beam along the desired course; whereas the signal from the second transmitter would be radiated in the form of two beams of opposite phases on each side of the course and with a deep null along the course.

It has already been said that when two unequal impedances are connected to terminals A and B, and the source of RF power is connected to terminal I, there is observed a voltage at terminal II. Let it be assumed that at terminal II there is connected a resistor, the value of which is equal to the characteristic impedance of the coaxial line 11, 12. It has been found that the current through this resistor, and, therefore, also the voltage across it, are fairly simply related to the degree of inequality existing between impedances connected to terminals A and B. Usually, although not always, it is desirable to use as a standard a resistive load. Let it be assumed, that it is desired to measure the degree of difference existing between an unknown load connected to terminal B and the standard load connected to terminal A. The difference between the impedance of the unknown load and the standard resistance $r$ may be described in various ways. A convenient way to measure this degree of difference is in terms of the absolute value and the phase of the reflection coefficient of the unknown load with respect to the standard resistance. The magnitude and the phase of this reflection coefficient are respectively equal to the magnitude and the relative phase of the returning traveling wave which would be observed if the unknown load were connected to a perfect transmission line having a characteristic impedance which is equal to the resistance of the standard load, when a wave of the unit amplitude is sent toward the unknown load. The phase reference in this case would be the phase of the unit wave as it arrives at a point in the line at which the unknown load is to be measured. It can be shown that there is a relatively simple relationship between the reflection coefficient of an unknown load as defined above and the signal which emerges into the resistor connected to terminal II. In fact, by measuring the amplitude and the phase of the signal which arrives at terminal II, it is possible to determine the reflection coefficient of an unknown load connected to terminal B with respect to the standard resistor $r$ connected to terminal A. Since the absolute value and the phase of the signal emerging from terminal II has no meaning, it is necessary that both the amplitude and phase of this signal be compared with the amplitude and the phase of some other standard signal observed elsewhere within or outside of the bridge network. It has been found that a suitable reference signal can be obtained by diverting a very small proportion of the power which goes into the standard load connected to terminal A. For this purpose a resistance voltage dividing network may be connected to the standard load and a very small proportion of the total power delivered to the standard load be diverted to an auxiliary load 24 as shown in FIGURE 2. The amplitude and the phase of the voltage developed across the load at terminal II may then be compared with the amplitude and the phase of the voltage developed across the auxiliary load. The actual comparison of the amplitudes of the two voltages can be done by very simple means. For example, the receiver may be first connected across the load at terminal II and then connected across the auxiliary load 24 in FIGURE 2 and the readings so obtained compared. The phase comparison can also be made by well known means.

A convenient method for measuring the relative phase of the voltages appearing across the auxiliary load and the load at terminal II is shown in FIGURE 2, in which 21 is a bridge circuit similar to that described in connection with FIGURE 1. X is an unknown impedance connected to terminal B of bridge circuit 21; 2 is a standard resistive load comprising a voltage divider arranged so that a small portion of the power delivered to terminal A is diverted into slotted line 23 and, having passed through it, into matched load 24. Element 24 is a resistive load which matches the characteristic impedance of the slotted line whereby a traveling wave is observed along the slotted line. Element 25 is a slider equipped with a pin or a loop type of pickup used to couple out a small proportion of the power traveling along the slotted line. The output of the slider is connected to terminal I of another bridge network 27. This bridge may be one similar to the bridge network at FIGURE 1. The opposite terminal II of bridge 27 is connected to terminal II of bridge 21. Terminal A' of bridge 27 is connected to a resistor $r_{27}$, preferably the value of which matches the characteristic impedance of the coaxial cables used to make the connections and, in particular, the connection from terminal B' of bridge 27 to resistance pad 28, to which the receiver is connected. The purpose of bridge 27 is to prevent the transmission of waves from terminal II of bridge 21 to slider 25. Such transmission would be harmful because usually slotted line sliders have a poor match with the characteristic impedance of the coaxial cable, so that a considerable proportion of the wave traveling toward the slider would be reflected and would be confused with the wave picked up by the slider from the slotted line. By using bridge 27, this phenomenom is avoided so that the receiver is enabled to measure the sum of the voltages, one picked up by the slider 25 and another received from terminal II of bridge 21. As slider 25 is moved along the slotted line 23, the phase of the voltage picked up by the slider gradually changes in proportion to the number of centimeters that the slider is moved along the slotted line. When the slider 25 is moved into such a position that voltages of opposite phases are developed at terminal B' of bridge 27 connected to the receiver, a minimum of signal is observed. The corresponding position of the slider along the slotted line is then recorded. From the known lengths, and their known phase delays, in cables 26, 29 and 30, and other portions of the arrangement, one could compute the relative phase of the signal voltage at terminal II of bridge 21 with respect to the voltage at the standard load 22. In turn, from this information, the phase of the reflection coefficient of the unknown load connected at terminal B of bridge 21 could then be determined. In practice such a method has been found to be cumbersome and another much more convenient method has been developed. This latter method involves the use of a section of coaxial transmission line terminated by a standard resistor which is carefully matched to the characteristic impedance of the coaxial transmission. The outer conductor of this transmission line is equipped with an iris, which is a metal plate with a hole in the center. The outer edge of this metal plate is metallically connected to the outer conductor of the coaxial line. The central hole in the plate is made sufficiently big for the inner conductor of the coaxial line to pass through it.

This arrangement is shown diagrammatically in FIGURE 3, in which 31 is the outer conductor of the section of the coaxial transmission line; 32 is the inner conductor of the same transmission line. Element 34 is the circular metal plate with a hole. The outer edge of the circular plate 34 is connected to the outer conductor 31. The inner conductor of the coaxial line passes through the hole in plate 34. As long as plate 34 is very thin in comparison with the inner diameter of the outer conductor 31, the electrical effect of plate 34 is to introduce a shunt capacitance between the inner and the outer conductors of transmission line 31, 32. This capacitance is applied exactly at the iris; that is, at the point where the plane of the plate would intercept the inner conductor. The phase angle of the reflection coefficient introduced by such an iris can be accurately computed by known methods when the amplitude of the reflection coefficient is known. Since the amplitude of the reflection coefficient can be measured either by known methods or by means of the bridge circuit of FIGURE 1 as outlined above, the load of FIGURE 3, which shall be referred to as iris load, can be used as a source of the reflection coefficient of known phase. By connecting the iris load to bridge 21 in FIGURE 2 in place of the unknown load X, that is, by connecting the iris load to terminal B, one can observe that position of slider 25 which results in the minimum of signal at the receiver with the iris load connected in place of the unknown load X. The difference in positions of slider 5 resulting in minimum at the receiver obtained with load X and with the iris load of FIGURE 3 gives a direct measure of the phase difference between the phase of the reflection coefficient of the unknown load X and the known phase of the iris load. Thus, the measurement of the phase of the reflection coefficient with the aid of the iris load is reduced to practically the same procedure which is now used in measurements made by means of slotted lines, the difference being that in the bridge measurements the iris load is used in place of the short circuit which is common in the case of slotted line measurements.

The iris load of the type shown in FIGURE 3 is not the only type of load that could be conveniently used as a phase reference. For example, an arrangement shown in FIGURE 3a could be used. This arrangement comprises a matched load 33a, terminating a section of coaxial transmission line comprising inner conductor 32a and outer conductor 31a. A metal plate 38 connected to inner conductor 32a may be used to introduce a capacitive discontinuity which can be used for purposes of phase reference in substantially the same manner as the iris load of FIGURE 3. It is desirable to make phase reference loads in such a way that the element responsible for introducing the reflector can be easily removed for checking the match of the resistive load; for example, in the arrangement of FIGURE 3, the plate 34 may be readily replaced by a ring which makes the outer conductor continuous.

An arrangement of the type shown in FIGURE 3b in which a reflector is introduced by a notch 39, in the inner conductor of a coaxial line 31B, 32B, terminated into a matched load 33B, can also be used as a phase reference provided the effect of the notch can be either computed with sufficient accuracy or calibrated by comparison with a known phase reference load such as, for example, one shown in FIGURE 3. A load comprising a resistance which is not quite equal to the chracteristic impedance of the transmission line can also be used provided it is accurately calibrated.

In general, it is preferably that a load which is used as a phase reference load have a reflection coefficient not more than two orders of magnitude greater than the reflection coefficient of the unknown impedances to be measured. In order to see the reason for this preference, consider the phase measuring arrangement shown in FIGURE 2.

In order to obtain indications of deep minima on the output meter 40 connected to the receiver in FIGURE 2, it is necessary that the wave which arrives from terminal II of bridge network 21 be comparable in magnitude to the wave which arrives from slider 25. Only two nearly equal waves can effectively cancel when they arrive in opposite phases. It is desirable to arrange the voltage division in load network 22 together with the attenuation in other parts of the circuit in FIGURE 2 so that deep minima are observed as slider 25 is moved along the slotted line. When the unknown load is to be replaced by an iris load, greatest accuracy of the phase measurement would be assured if the circuit remained unaltered except for the interchange of the loads. Since the magnitude of the voltage developed at terminal II of bridge 21, at least in the case of small reflection coefficients, is proportional to the magnitude of the reflection coefficient being measured, it follows that the near equality between signals delivered from slider 25 and from terminal II would be disturbed if the signal from terminal II were increased many times which would be the case if the reflection coefficient of the phase comparison load is much greater than that of the unknown. It was found that when the circuit is adjusted so that reflection coefficients around (corresponding to the standing wave ratio around 1.02) result in very deep minima, phase reference load having a reflection coefficient around .1 can be used, but a phase reference load having a reflection coefficient greater than .15 produces very shallow minima that are rather difficult to read, so that accuracy is sacrificed. When the circuit is adjusted for very deep minima with reflection coefficients around .01 the minima obtained with reflection coefficients around .001 are still usable. Some improvement in the depth of the minima can be achieved without the risk of introducing phase errors by moving the pickup loop or pin in slider, such as 25 in FIGURE 1, closer or farther away from the inner conductor of the slotted line. The reference signal can also be varied by means of an adjustable potentiometer but only at the cost of some phase errors.

It has been found that with an accurately constructed bridge network, it is possible to perform measurements with much greater accuracy than is possible with very accurately constructed slotted lines. For example, it has been found that it is possible to measure standing wave ratios of the order of 1.002; whereas, with the slotted lines, it is very difficult, if not virtually impossible, to measure the phase of the reflection coefficient corresponding to a standing wave ratio below 1.02, by means of the bridge circuit herein described, it was found possible to make measurements of the phase of the reflection coefficients corresponding to standing waves of the order of 1.003.

In order to achieve the greatest accuracy, it was found desirable to avoid the use of an auxiliary load such as load 24 in FIGURE 2. It was found that the construction of a standard load which very accurately matches the impedance of a given coaxial transmission line, which is normally a desired objective, is made more difficult by the complication introduced by the addition of the voltage divider. This additional complexity in the construction of standard loads may be avoided by the addition of a reference connection to the bridge, shown in FIGURE 1.

FIGURE 4 shows a bridge network provided with such a reference connection. This network is substantially similar, in all respects, to the network shown and described in connection with FIGURE 1, except for the addition of coaxial terminal V. The outer conductor of this coaxial terminal is connected to conductor 2B of the U-shaped conductor 2 inside cavity 1. The inner conductor of terminal V is brought through a hole in wall 1D of the cavity into the hollow space inside conductor 2B, which for this purpose should be tubular. This inner conductor 41 is insulated from conductor 2B by the use of insulators such as, for example, beads 42 and 43. At a point substantially opposite to that at which inner conductor 14 of terminal A is connected to conductor 2B, the inner conductor 41 is brought through a hole in conductor 2B, and is connected or coupled to conductor 2A. A metallic connection is relatively simple. Tubes 44–45, similar to tubes 9, 10 may be used to improve the balance of the bridge. Tube 45 may be equipped with a metal plug 45a to which conductor 41 is connected. In turn, tube 44 is metallically connected to conductor 2A.

In the arrangement shown in FIGURE 5, the bridge is similar in principle to that shown in FIGURE 1, except that the bridge is folded 180° to partly return upon itself. The source numerals as far as applicable, as used in FIGURE 1 will be applied to FIGURE 5. Terminal I is at the left end of the bridge structure extending outward from the end 1D of the bridge cavity 1. The cavity 1 has within it the outer conductor 2B which may or may not be a coaxial cable as shown in FIGURES 4 or 1 and which makes two 90° bends at the right end of the cavity as shown by the conductor 60, which connects to the returning conductor 2B'. A wall is formed by the bottom 62 of the upper section of cavity 1 and the top 63 of the lower section of the cavity 1. Terminals A and B may be used similarly as in FIGURE 1, terminal A being shown to the right of the figure. Terminal II is shown at the left of the figure. The conductors 2A and 2A' are not seen in FIGURE 5 because they run parallel to conductors 2B and 2B'.

In the arrangement shown in FIGURE 6, a pair of terminals may be brought out of each end of the bridge, terminals 70 and 71 from the top end of the bridge and terminals 72 and 73 from the lower end of the bridge. Terminals 70 and 71 have inner conductors 75 and 76 connected to conductors 2B'' and 2A'' respectively which are joined together part way down the cavity 1' in the section 77 from which region two parallel coaxial cables 78 and 79 extend to the lower end of the cavity 1' energizing terminals 72 and 73 with inner conductors 80 and 81 which extend through the coaxial cables 78 and 79 and through the joining coaxial conductors 2B'' and 2A''. The coaxial cables 78 and 79 may themselves be formed as a casing with a central dividing partition and with the inner conductors 80 and 81 one in each partition. A fifth terminal 82 may be brought out from the side of the cavity 1' and this may be a coaxial conductor with its inner conductor 83 connected to junction 2A'' and 2B'' at the bend 77.

The conductors 80 and 81 may be extended through the sides of outer conductors 2B'' and 2A'' at the collars 84 and 85 respectively and connected to conductive plates 86 and 87 respectively in similar collars 88 and 89 extending from conductors 2B'' and 2A'' respectively.

In the operation of this bridge circuit, FIGURE 6, the reference signal would be measured at the terminal 72 and the signal generator impressed on the terminal 73 with the load on the terminal 70 and the standard on the terminal 71 while the error signal would be measured at the terminal 82.

The arrangement in FIGURE 7 is substantially the same as in FIGURE 6, the terminals 72 and 73 corresponding to the same numbered terminal in FIGURE 6 and the terminals 70 and 71 in FIGURE 7 also corresponding to the same numbered terminals as in FIGURE 6, except that they are brought out from the sides of the cavity 1 rather than the top. The inner and outer conductors also conform as indicated by the use of the same numerals.

In the operation of the system in the bridge structure shown in FIGURE 4, the transmission line comprising inner conductor 41 and outer conductor 2B may be used as a source of reference signal impedance measurements made with the aid of the bridge. If this transmission line is terminated into a matching load such as, for example, an attenuating pad, the voltage developed across the pad would be proportional to the voltage developed between conductors 2A and 2B. The phase of the voltage developed across the pad is very simply related to the phase of the voltage developed between conductors 2A and 2B at the points where the standard load and the unknown load are connected, namely, terminals A and B respectively. Thus, the output of the reference line can be used in place of the small fraction of the power delivered to the standard load. If bridge 21 in FIGURE 2 were equipped with the reference line, cable 30, used to connect the input of the slotted transmission line 23 to the voltage divider 22, can be connected instead to the reference line 41–2B either directly or through a resistance pad, the input impedance of which is matched to the characteristic impedance of the transmission line comprising inner conductor 41 and outer conductor 2B.

When a bridge network of the type described in connection with FIGURE 1 or one shown in FIGURE 4 is to be designed for lower frequencies, for example, for use at 50 megacycles, it is convenient in order to reduce the length to bend the structure back on itself as has been shown in FIGURE 5. The arrangement shown in FIGURE 5, as has been stated, is similar to that shown in FIGURE 4 in which the cavity, as well as conductors 2A and 2B, are bent back on themselves so as to conserve the length.

In FIGURE 8 is shown a bridge network which has been found very useful for making measurements of very high accuracy. This bridge network, like those described above, can also be used as a diplexer. The network in FIGURE 8 comprises an elongated cavity 91. Within this cavity two channel-like conductors 92A and 92B are effectively connected to the cavity wall 91D. At their other ends, conductors 92A and 92B are connected to each other through a tapered metal piece 92C. Inner conductor 97 is brought through wall 91D and is coupled or connected to the inner wall of channel conductor 92A or to the inner wall of channel conductor 92B at the connector 120. This connection is accomplished at some distance from wall 91D. Through a hole in wall 91C of cavity 91 is brought out a hollow conductor 101 and insulated from 101 is brought in still another conductor 99. Conductor 99 is continued through a hole in the tapered piece 92C into the space between 92A and 92B and until it reaches substantially the middle of conductors 92A and 92B where conductor 99 is effectively connected to one of these two conductors by connector 121. Also, preferably near the middle sections of conductors 92A and 92B are connected two other conductors 94 and 96. These conductors 94 and 96 are brought through holes in the long walls of cavity 91 and are surrounded for some distances, which in some cases could be zero, by outer conductor 93 and 95 respectively, which are connected to the walls of cavity 91. At an arbitrary point which, for convenience, is usually not far from end wall 91C, there is made a T connection with conductor 101. This T connection comprises an outer conductor 110 and an inner conductor 111. The latter is connected to inner conductor 101 and the outer conductor 110 is connected to the outer hollow conductor 102. Conductor 102 is effectively connected to end wall 91C of the cavity.

At a point preferably one-quarter wavelength away from this T connection on the right of the T there is placed a short circuiting plug 112 for establishing an effective connection between the outer conductor 102 and inner conductor 101. The position of this plug is not very critical, but it is preferable to make it movable so that its position could be adjusted so that the distance between the T connection and the plug could be kept in the vicinity of one-quarter wavelength at the various frequencies at which measurements are to be made or the bridge to be otherwise operated.

When the bridge network of FIGURE 8 is used for measuring impedances, the output at the terminal $T_1$ is used as the source of the "error signal." The output of coaxial line 101–99 at $T_2$ is used as the source of reference signal. The transmission line comprising outer conductors 92A, 92B and inner conductor 97 is connected to the source of signal at terminal $T_3$ for example, the signal generator. Transmission line comprising inner and outer conductors 94, 93 is connected to the standard load at terminal $T_4$ while transmisison line comprising inner conductor 95 is connected to the unknown at terminal $T_5$. Because of the symmetry of the structure, the connections of the standard and the unknown may be interchanged. The measurements may be made as previously explained above.

The following additional information is offered in an effort to aid in the design of the bridge networks described herein. It has been found preferable to make the overall lengths of conductors, such as 2A and 2B of the bridge network in FIGURE 1, equal to the half wavelength at the arithmetic mean frequency of the limits of the band over which the bridge network is to be operated. The length of the cavity, such as 1 in FIGURE 1, should be a small fraction of a wavelength longer than conductors 2A and 2B. The width and the depth of the cavity should each be equal to the small fraction of a wavelength. The cross-sections of conductors 2A and 2B in FIGURE 1 should preferably be equal to each other and should be so chosen that when operated in the unbalanced mode they will have a characteristic impedance which is substantially equal to .707 times the characteristic impedance of the coaxial transmission line connected to terminal II.

In FIGURE 8, the impedance connected to terminal $T_1$ to measure the error signal should match the impedance of the coaxial line from this terminal extending through the cavity 91.

When the bridge network described in connection with FIGURE 8 is used as an impedance measuring device, the following formula gives the theoretical relation between the error signal at terminal $T_1$ and the reference signal at terminal $T_2$:

$$\frac{E_O}{E_R} = \frac{\frac{1}{Z_S}-\frac{1}{Z_X}}{\frac{1}{Z_X}+\frac{1}{Z_S}+\frac{1}{Z_{ov}}+\frac{1}{\partial Z_{ov}} \text{tem } o}$$

in which:

$E_O$=Error signal at terminal $T_1$
$E_R$=Reference signal at terminal $T_2$
$Z_S$=Standard load impedance at terminal $T_4$ or $T_5$
$Z_X$=Unkown load impedance at terminal $T_5$ or $T_4$
$Z_{ov}$=Characteristic impedance of the error signal transmission line comprising conductors 92A and 92B operating in the parallel mode in cavity 91.
$O$=Length, expressed in electrical degrees, measured longitudinally from cavity end plate 91D to the point of connection of conductors 94 and 96 with conductors 92A and 92B.

A simpler relation which holds approximately for small unbalances providing $$Z_S = Z_{ov}$$

and $$O = 90°$$

is given as follows:

$$\frac{E_X}{E_R} = \frac{2\rho}{3}$$

in which $$\rho = \frac{Z_X - Z_S}{Z_X + Z_S}$$

The approximation is good for values of $\rho$ less than 0.1, and becomes better as $\rho$ becomes smaller.

FIGURE 9 shows a printed circuit version of a bridge network. This network is in many respects substantially similar, in operation, to the network shown and described in connection with FIGURE 1. FIGURE 9A shows a section of FIGURE 9 at section 9A in FIGURE 9. Numeral 1 denotes a metal foil ground plate attached to the bottom surface of insulating sheet 3. While ground plate 1 does not completely surround the structure, it nevertheless substantially performs the electrical function of cavity 1 in FIGURE 1. Metal foil conductor 2 with legs 2A and 2B, attached to the bottom surface of insulating sheet 5, likewise essentially duplicates the electrical functions of conductor 2 in FIGURE 1. External connection is made to the bridge at terminal A between ground plate 1 and extension 14 on foil conductor 2B. Likewise, connection is made at terminal B between ground plate 1 and extension 16 on foil conductor 2A. Similarly, connection is made at terminal II between ground plate 1 and extension II on foil conductor 2 where legs 2A and 2B are joined. At the opposite end of the structure, legs 2A and 2B are both connected to ground plate 1 by means of rivets 20, 21 and 22. On legs 2B and 2A, numerals 9 and 10 denote extensions which are helpful for preserving the balance. External connection is made to the bridge at terminal I between ground plate 1 and metal foil conductor 4 which is attached to the top surface of insulation sheet 5. Leg 4A and leg 2A function respectively as inner and outer conductors of a radio frequency transmission line. Conductor 4 is brought across the gap between extension 9 and 10 and coupled through leg 4B to leg 2B. To obtain good balance, the width of conductor 4 and the thickness of insulating sheet 5 are both preferably made small enough so that conductor 2 acts as an effective shield between conductor 4 and ground plate 1.

I claim:

1. A system for comparing an unknown load with a standard load comprising, a high frequency coaxial bridge having four coaxial terminals, means for supplying energy to an input one of said coaxial terminals to develop signals, an unknown load and a standard load, means for coupling said unknown load and said standard load to respective side coaxial terminals on opposite sides of the bridge, the inputs and outputs on opposite ends of the bridge comprising the remaining two coaxial terminals, an auxiliary load, means coupling said auxiliary load to said standard load to draw off a small fraction of the energy received by said standard load and means for comparing the signal at said auxiliary load with the signal at said output as a measure of the unknown load.

2. A system for comparing an unknown load with a standard by the use of two high frequency coaxial bridges with an unknown and standard impedance connected on opposite sides of one bridge, a signal generator connected at one end of said one bridge and a coaxial line from the other end of said bridge to a first side of the second bridge, a known resistance and meter at two other opposite sides of said second bridge, means connecting the remaining side of said second bridge to said standard, and means for adjusting the position of said connection to said standard including a slotted line terminated in a resistance of its characteristic impedance and having a slider coupled to said remaining side for producing fluctuations on said meter as said slider is moved representative of the relative phase between energy then applied to said first and said remaining sides of said second bridge.

3. A system for comparing an unknown load with a standard by the use of two high frequency coaxial bridges with an unknown and standard impedance connected on opposite sides of one bridge, a signal generator connected at one end of said bridge and a coaxial line from the other end of said bridge to the second bridge, a known resistance and meter at opposite sides of said second bridge, means connecting the other end of said second bridge to said standard, comprising a coaxial line having a slotted section terminating in a matched impedance and a slider movable along said slotted section whereby the position of the slider may be observed when a minimum is read on said meter.

4. In a measuring system, means including a hybrid bridge with four terminal pairs for comparing the phase difference between an unknown load and a known load coupled to respective terminal pairs on opposite sides of said bridge, said known load comprising a pair of coaxial conductors having a resistive load connected between the two coaxial conductors of the pair and means defining a shunt capacitance discontinuity between said two coaxial conductors essentially in a plane orthogonal to the plane of said two coaxial conductors.

5. In a measuring system, means including a hybrid bridge with four terminal pairs for comparing the phase difference between an unknown load and a known load coupled to respective terminal pairs on opposite sides of said bridge, said known load comprising coaxial inner and outer conductors having a resistive load connected between the conductors and a plate attached to the outer conductor with a hole therethrough substantially larger in diameter than the thickness of said plate into which hole said inner conductor extends forming a capacitance between outer and inner conductors essentially in the plane of said plate.

6. In a measuring system, means including a hybrid bridge with four terminal pairs for comparing the phase difference between an unknown load and a known load coupled to respective terminals on opposite sides of said bridge, said known load comprising coaxial inner and outer conductors having a resistive load connected between the conductors and a plate attached to the outer conductor with a hole therethrough substantially larger in diameter than the thickness of said plate into which hole said inner conductor extends forming a capacitance between outer and inner conductors essentially in the plane of said plate.

7. In a measuring system, means including a hybrid bridge with four terminal pairs for comparing the phase difference between an unknown load and a known load coupled to respective terminal pairs on opposite sides of said bridge, said known load comprising coaxial inner and outer conductors having a resistive load connected between the conductors and a plate attached to the outer conductor with a hole therethrough substantially larger in diameter than the thickness of the plate and providing a capacitance relation between said inner and outer conductors at the edge of said plate.

8. A system for comparing an unknown load with a standard by the use of two high frequency coaxial bridges with an unknown and standard impedance connected on opposite sides of one bridge, a signal generator connected at one end of said bridge and a coaxial line from the other end of said one bridge to one end of the second bridge, indicating means, means connecting the other end of said second bridge to said standard, the latter means comprising a coaxial line having a slotted section terminating in a matched impedance and a slider movable along said slotted section whereby the position of the slider may be observed when a minimum is read on said indicating means, means coupling said indicating means to one side of said second bridge, and resistive means coupled to and terminating the other side of said second bridge.

References Cited by the Examiner

UNITED STATES PATENTS

| 2,425,084 | 8/1947 | Cork et al. | 324—58 |
| 2,746,015 | 5/1956 | Alsberg | 324—58 |
| 2,760,156 | 8/1956 | Flecher | 324—58 |

WALTER L. CARLSON, *Primary Examiner.*

SAMUEL BERNSTEIN, *Examiner.*